United States Patent [19]
Sontheimer

[11] 3,985,304
[45] Oct. 12, 1976

[54] ROTARY FOOD PROCESSING APPARATUS
[76] Inventor: Carl G. Sontheimer, 14 Gray Oaks Lane, Greenwich, Conn. 06830
[22] Filed: Apr. 14, 1975
[21] Appl. No.: 567,732

[52] U.S. Cl. ................................................ 241/92
[51] Int. Cl.² ........................................ B02C 18/12
[58] Field of Search ............................... 241/91, 92

[56] References Cited
UNITED STATES PATENTS

| | | | |
|---|---|---|---|
| 2,590,909 | 4/1952 | Westby et al. | 241/92 X |
| 2,678,073 | 5/1954 | De Nardis | 241/92 |
| 3,032,087 | 5/1962 | Rodwick | 241/92 |
| 3,085,607 | 4/1963 | Schottle | 241/92 |
| 3,892,365 | 7/1975 | Verdun | 241/92 |

Primary Examiner—Granville Y. Custer, Jr.
Attorney, Agent, or Firm—Parmelee, Johnson & Bollinger

[57] ABSTRACT

In food processing apparatus having a working bowl with a motor-driven shaft extending vertically upwards through the bottom of the bowl and various selected rotary tools having disc-like cutting tool members positioned in the top of the bowl which can be engaged with this shaft for processing food introduced through a feed tube in a cover secured over the bowl during use, improved rotary food processing apparatus is provided preventing the cutting surfaces of the disc-like member from inadvertently coming into contact with the undersurface of the cover. The disc member is provided with one or more rounded bearing elements elevated above the cutting elements by a small amount, for example in the range from 1/32 to 3/32 of an inch. These bearing elements are positioned closely adjacent to the periphery of the disc member, and in one illustrated embodiment the bearing element is formed directly at the periphery, thereby not impeding the feeding of food items to the cutting elements in the disc member. In normal operation the cutting elements clear the cover by a slightly greater amount than the elevation of the bearing elements for example ⅛th of an inch, such that these elevated bearing elements also clear the undersurface of the cover. In the event that the user inadvertently overloads the rotating disc cutting tool in either manner described, these bearing elements advantageously slide against the undersurface of the cover almost effortlessly for holding the cutting elements spaced slightly away from the horizontal undersurface of the cover thereby protecting both the cover and the rotating tool.

7 Claims, 7 Drawing Figures

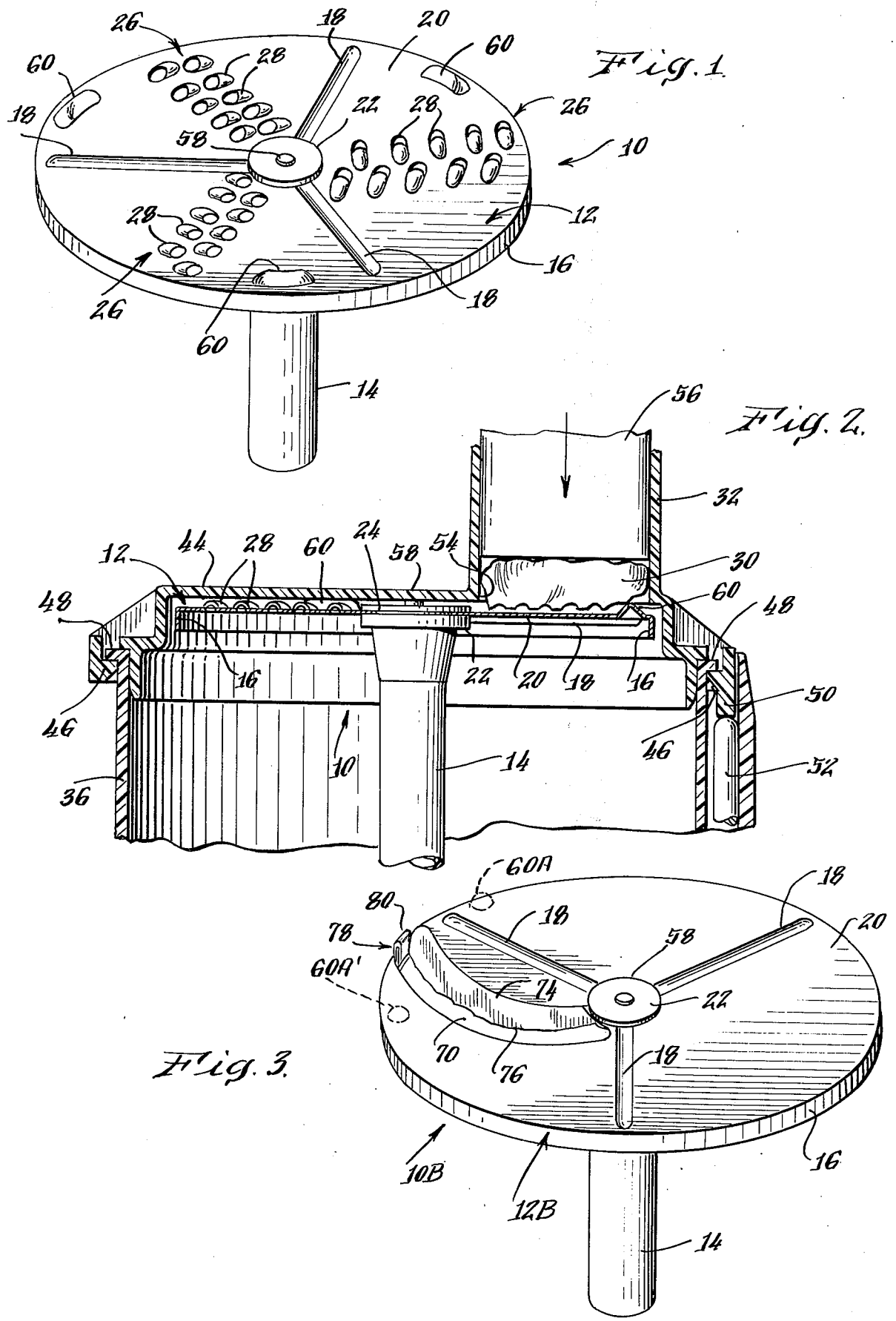

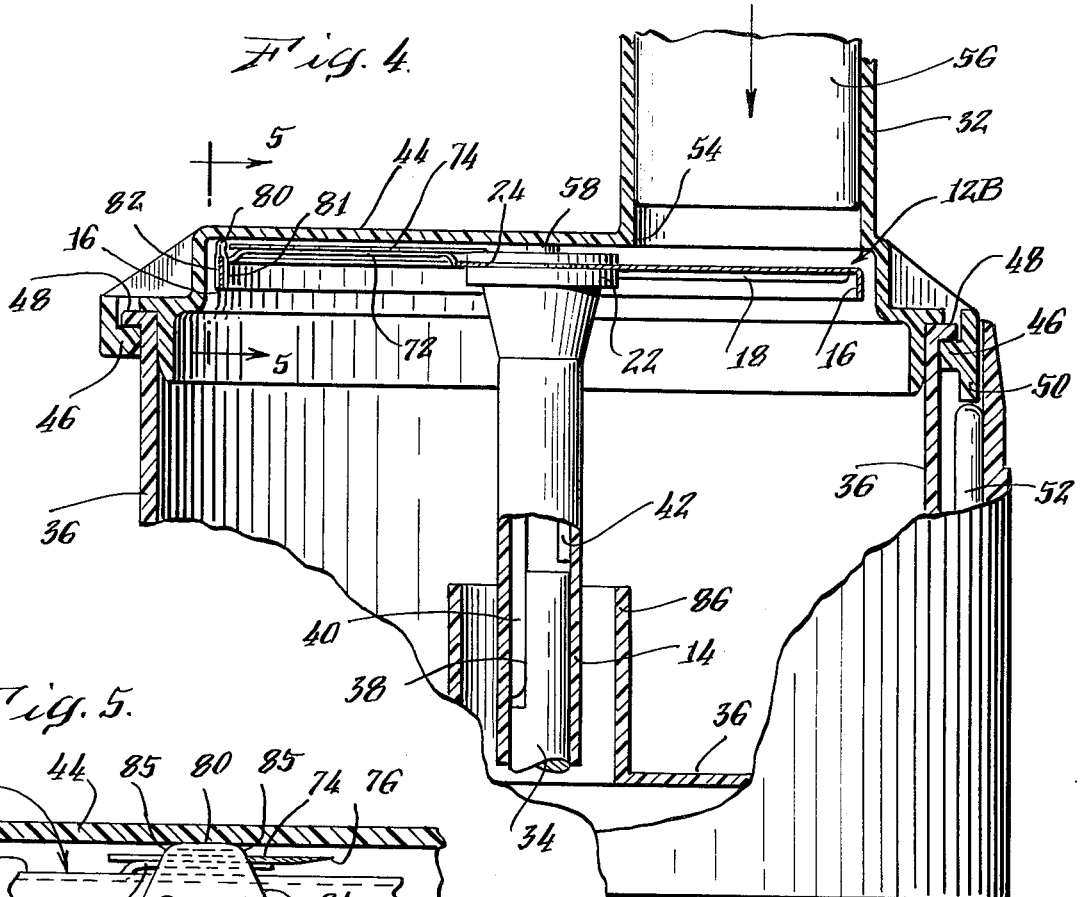
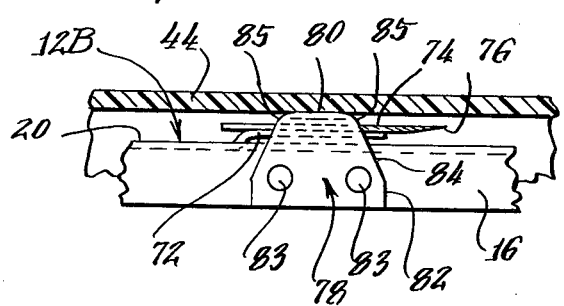
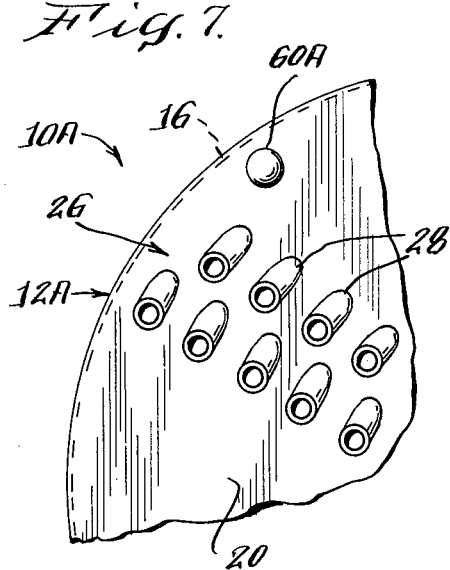
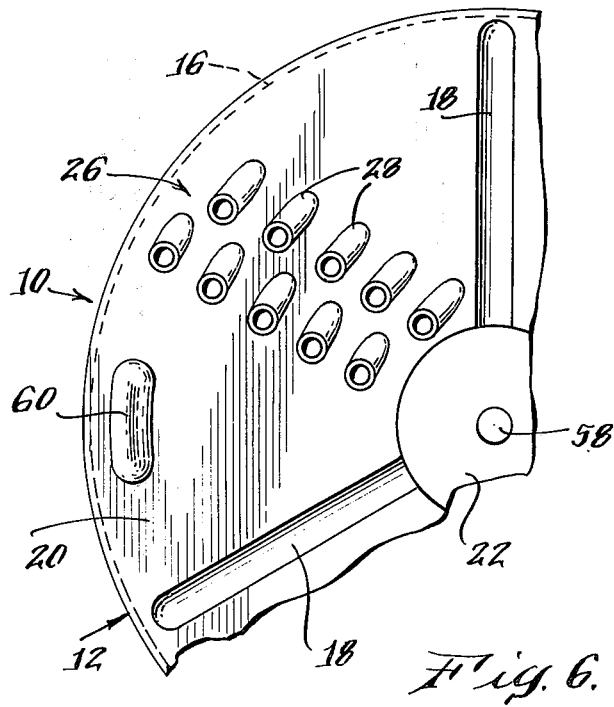

ROTARY FOOD PROCESSING APPARATUS

FIELD OF THE INVENTION

The present invention relates to apparatus for preparing food, and in particular to multi-purpose kitchen apparatus in which a plurality of rotary food preparing tools, including tools such as cutting discs, slicing discs, rasping discs, grating discs, etc. are used for performing the operations of cutting, slicing, rasping or grating of food items.

BACKGROUND OF THE INVENTION

There is food processing apparatus of the type broadly set forth above having a working bowl or vessel with a motor-driven shaft projecting vertically upwards through the bottom of the bowl on which various selected rotary tools can be engaged to be driven by the shaft for performing various food processing operations as may be desired by the user. A detachable cover is secured over the top of the bowl during use. This cover includes a hopper or feed tube which has a mouth that opens downwardly through the cover into the top of the bowl. The food items to be prepared are placed in this feed tube and then are manually pushed down through the feed tube into the bowl by means of a removable pusher member which is adapted to slide down in the manner of a plunger into this feed tube. For further information about this type of food preparing apparatus the reader may refer to U.S. Pat. No. 3,892,365 - Pierre Verdun.

The rotary tools include cutting discs, slicing discs, rasping discs, grating discs, etc. which have a disc-like cutting tool member formed of sheet metal, preferably stainless steel, with one or more cutting elements projecting above the upper surface of the cutting disc member. These tools which have a disc-like cutting member are intentionally positioned in the top of the bowl near the lower surface of the cover where they can cut, slice, rasp or grate the food items entering downwardly from the feed tube into the top of the bowl. For the purpose of positioning the disc-like cutting tool member in the top of the bowl, the rotary tool includes a relatively long hollow hub extending relatively far down into the bowl. This hollow hub slides vertically down around the upper end of the motor-driven shaft. In order to provide a driving connection between the shaft and this hollow hub, the shaft is formed with driving coupling means, such as a flat face or keyway on one side, and the hollow hub has complementary coupling means, such as internal lugs or keys, for engaging the shaft.

As examples, the food items to be sliced or cut may be such as, cucumbers, carrots, cabbage, onions, potatoes, raddishes, squash, peppers, celery, turnips, parsnips, beets. Food items to be rasped or greated may be such as cheese, carrots, potatoes, cabbage and lemons.

In some cases in using the prior art tools which have such a disc-like cutting member the user may become so intent upon processing the food items as not to notice that the bowl beneath the cutting member has become full of the processed food. In such cases the user may continue to process food until finally the bowl becomes so full that the food forces the disc-like cutting member of the rotary tool upwards against the lower surface of the cover.

In this type of food processing apparatus the rotary tool is usually driven at a speed in the range from 1,000 revolutions per minute (RPM) to 2,000 RPM, and the electric driving motor is relatively powerful so that it cannot readily become stalled. Consequently, when the disc-like cutting member becomes forced up against the cover, it can scratch or scour the cover as well as dull the tool. The cover is usually made of rigid transparent plastic for convenient observation of the processing operation. The scratching or scouring of the lower surface of the cover thereafter makes difficult the observation of food processing. Also, the roughened cover surface is much harder to clean than the original glass-like smoothness of the rigid plastic.

In other cases in using these prior art rotary tools, the user may become overly enthusiastic or too vigorous in forcing the food item, such as cheese or carrots, down through the feed tube. The result is to depress the sector of the disc-like cutting members where the food item is being pressed down upon it. In extreme cases the opposite sector of the cutting member becomes deflected up against the lower surface of the cover, again causing a scratching or scouring of the cover and a dulling of the rotary tool.

In prior art rotary tools a small central raised button has been provided at the hub, but such a central button has not prevented the deflection of the disc-like cutting member up against the cover in either manner as described above.

SUMMARY OF THE INVENTION

In accordance with the invention improved rotary food processing apparatus is provided which prevents the cutting surfaces of the disc-like cutting tool member from inadvertently coming into contact with the undersurface of the cover on the working bowl. The disc-like cutting tool member is provided with one or more rounded bearing elements elevated above the cutting elements on the disc member by a small amount, for example in the range from 1/32 to 3/32 of an inch. These bearing elements are positioned closely adjacent to the periphery of the disc member, and in one of the illustrated embodiments the bearing element is formed directly at the periphery. Thus, the bearing elements do not impede the feeding of food items to the cutting elements in the disc member. In normal operation the cutting elements clear the undersurface of the cover by a slightly greater amount than the elevation of the bearing elements for example 1/8 of an inch, such that in normal operation these elevated bearing elements also clear the undersurface of the cover. In the event that the user inadvertently overloads the rotating disc cutting tool in either manner described, these bearing elements advantageously slide against the undersurface of the cover almost effortlessly for holding the cutting elements spaced slightly away from the horizontal undersurface of the cover thereby protecting both the cover and the rotating tool.

The various features, aspects and advantages of this invention will become more fully understood from a consideration of the following description of three illustrative embodiments of the invention when considered in conjunction with the accompanying drawings.

BRIEF DESCRIPTION OF THE DRAWINGS

FIG. 1 is a perspective view of a rotary food processing tool embodying the present invention;

FIG. 2 is a cross-sectional view of the upper portion of a working bowl with the cover secured thereon and with the rotary food processing tool of FIG. 1 shown partially in cross section positioned in the top of the bowl near the lower surface of the cover;

FIG. 3 is a perspective view of another rotary food processing tool embodying the invention;

FIG. 4 is a cross section view similar to FIG. 2 and showing the rotary food processing tool of FIG. 3 near the lower surface of the cover;

FIG. 5 is an enlarged partial cross-sectional view taken along the line 5—5 in FIG. 4;

FIG. 6 is a plan view of a portion of the rotary tool of FIG. 1; and

FIG. 7 is a partial plan view similar to FIG. 6 showing another embodiment of the invention.

DETAILED DESCRIPTION

As shown in FIGS. 1, 2 and 6, a rotary food processing tool 10 incorporating a first embodiment of the present invention includes a disc-like cutting member 12 which is rotated about the vertical axis of a relatively long hollow hub 14. This hub may be formed of rigid plastic material. The disc-like member 12 is formed of sheet metal, preferably stainless steel, having a downturned flange 16 extending around the periphery. The horizontal area 20 of the disc member 12 may be stiffened by a plurality of radial ribs 18 formed by indenting rounded grooves having a generally semi-circular cross section and extending from the center out almost to the flange 16.

The long hollow hub 14 is shown having a somewhat enlarged head 22 (FIG. 2) made of rigid plastic which is molded to the center of the disc member 12. For example, there may be a central aperture 24 (FIG. 2) in the horizontal area 20 of the sheet metal with the enlarged head 22 integrally molded through this aperture 24 above and below the metal area. If desired, the long hollow stem 14 of the hub may be removably secured to the head 22 as by fitting into a socket therein (not shown) for convenience of manufacture and storage.

Three groups or clusters 26 of small claws 28 are formed by drilling or punching a series of small holes and then punching upwardly small sharpened cutting edge regions of the horizontal metal area 20 behind each hole. These claws 28 are adapted to rasp or grate the lower surface of food item 30 such as listed above inserted down through a hopper or feed tube 32 (FIG. 2) as will be explained in detail further below.

In use the elongated hollw stem 14 of the hub is slid down onto a vertical motor-driven shaft as shown at 34 in FIG. 4 which projects up into a food processing bowl 36. To provide a drive coupling between the shaft 34 and the hub stem 14, the shaft is formed with drive coupling means 38 on one side, for example such as a flat region or keyway, and the inner surface of the hollow hub stem 14 contains complementary drive coupling means 40, such as internal lug or key means. Also, stop means 42 such as a shoulder within the hub stem 14 normally rests down onto the top end of the drive shaft 34 for properly positioning the rotary disc-like cutting member 12 in the top of the bowl 36. The drive shaft 34 rotates at a fairly high rate such as 1,000 to 2,000 RPM.

When food is being processed, a transparent cover 44 of rigid plastic is secured to the top of the bowl 36 by means of inturned anchoring lugs 46 (FIG. 2) on the lid which are captured beneath retaining ledges 48 formed integrally with the upper edge of the bowl. The lugs 46 are positioned under these ledges by placing the cover onto the bowl and then turning it slightly. As the cover is turned, a cam 50 serves to depress a push rod 52 for actuating a switch (not shown) to energize the driving motor for the shaft 34 (FIG. 4).

The feed tube or hopper 32 is integral with the cover 44 and has a mouth 54 which opens down through the lower surface of the cover. A manually operated removable push member or plunger 56 serves to push the food items 30 down against the rotating disc-like cutting member 12. Normally, the rasping or grating claws 28 are spaced approximately ⅛th of an inch below the lower surface of the cover 44. There is a small raised button 58 at the center of the hub 22.

The above-described apparatus is known in the prior art, and if the reader wishes further information thereon, reference may be made to the Verdun Patent mentioned above.

As described in the introduction, with the prior art apparatus the user may cause the cutting elements 28 to lift up into contact with the cover. This mechanical interference with the cover could occur by overly filling the bowl 36 with processed food thereby deflecting upwardly the whole outer region of the disc-like member 12 around near the periphery of the area 20 so that the cutting elements 28 would scrape against the cover. Another way this interference with the cover could occur is for the user to press down very hard on the pusher 56 which would deflect the opposite side of the rotating disc member 12 up against the cover.

In order to prevent the grating or rasping cutting elements 28 from coming into contact with the lower surface of the cover 44, three bearing elements 60 are embossed into the horizontal area 20 of the disc-like member 12. These embossed humps 60 have smoothly rounded upper surfaces as seen in FIGS. 1, 2 and 6, and they may be elongated somewhat circumferentially in the direction of their travel, as seen most clearly in FIG. 6, which is drawn full scale in the drawing as submitted. Each bearing hump 60 precedes one of the groups 26 of the rasping or grating elements 28. As shown in FIG. 6, there is an angular displacement of approximately 10° to 45° between the center of each cutting cluster 26 and the bearing hump 60.

These bearing humps are embossed in the horizontal area 20 closely adjacent to the downturned flange 16 as seen in FIG. 2. For example, the rounded ridge of this hump may be located radially inwardly in the range of 3/32 to ⅜ of an inch from the perimeter of the disc member 12. It is desirable to position these rounded bearing humps 60 as close to the perimeter of the disc member 12 as embossing techniques reasonably permit so that they do not unduly interfere with the food item 30 being pushed down. In this example, as shown in FIG. 6, the top of the hump is located radially inwardly 5/16 of an inch from the perimeter of the disc member 12.

The top of each bearing hump is elevated a small distance, say, 1/32 to 3/32 of an inch above the plane of the tops of the rasping or grating cutters 28. In this preferred embodiment the humps 60 are elevated 1/16ths of an inch above the cutting elements 28 and their rounded ridges are approximately ⅜ths of an inch long while the overall length of the embossed hump is approximately ¾ths of an inch. Thus, as shown in FIG. 2, in the event that the disc member 12 is deflected or raised upward, the rounded ridges of these bearing humps 60 slide smoothly and almost effortlessly against the undersurface of the cover, thereby preventing the cutting elements 28 from coming in contact with the cover.

FIG. 2 illustratively shows one of the bearing humps 60 sliding up against the cover. It is to be understood that this FIG. 2 drawing is for purposes of illustration. In normal running operation the bearing humps 60 clear the horizontal undersurface of the cover by a small distance such as 1/32 to 3/32 of an inch.

FIG. 7 shows a modified embodiment of the invention in which the embossed bearing humps 60A are generally hemispherical. They may be positioned so as to precede or to follow the center of the cluster 26 of cutting elements 28, by an angular displacement in the range from 10° to 45°. FIG. 7 shows the bearing element 60A angularly displaced behind the group 26 of the claws 28. The tops of these humps 60A are elevated by a small amount such as from 1/32 to 3/32 of an inch above the cutting elements 28. The disc-like cutting member 12A of the rotary tool 10A shown in FIG. 7 is otherwise identical to the corresponding disc member 12 of the tool 10.

It is to be understood that each of the elongated bearing humps 60 (FIGS. 1 and 6) may be angularly displaced behind the respective groups 26 of the claws 28 with which it is associated.

The rotary food processing tool 10B shown in FIGS. 3, 4 and 5 is used for slicing or cutting food items such as listed above and is generally similar to the rotary tool 10. The disc-like member 12B includes an arcuate slot 70 formed in the horizontal metal area 20 and extending from the hub head 22 out to the peripheral flange 16. The trailing edge 72 (FIG. 5) of this slot is pressed upwardly to form a horizontal ledge behind the open slot 70. This ledge may be sharpened to form a cutting edge or alternatively a curved hardened steel blade 74 may be spot welded onto the ledge 72 with its arcuate sharpened cutting edge 76 projecting forwardly partially over and above the open slot 70. This cutting edge 76 may be serrated or scalloped slightly as seen in FIG. 3. This rotary cutting tool as described in this paragraph is known in the prior art.

In order to prevent the slicing or cutting blade 74 from becoming deflected up against the underside of the cover 44, I provide a bearing element 78 (FIG. 5) having an elongated rounded ridge 80. This bearing element 78 is formed by a strip of hard steel bent into a narrow inverted U shape, as seen in cross section in FIG. 4, thus providing two parallel legs 81 and 82 which are closely spaced. One of these legs 81 is slid down inside of the portion of the downturned flange 16 where this flange spans or bridges across the outer end of the slot 70. The other leg 82 is slid down outside of this slot-bridging portion of the flange 16. Then, the legs 81 and 82 of the bearing element 78 are spot welded as shown at 83 (FIG. 5) to the flange 16.

It is the rounded bight of the inverted narrow U-shape which forms the rounded bearing ridge 80. Also, as shown in FIG. 5, the leading and trailing edges of the two legs may be tapered upwardly as indicated at 84 and rounded at 85 so as to fair smoothly into the rounded bearing ridge 80. The rounded bearing ridge 80 is approximately 1/4th of an inch long in the circumferential direction as seen in FIG. 5 and it projects above the upper surface of the blade 74 by a small amount in the range from 1/32 to 3/32 of an inch.

This bearing element 78 is advantageously positioned at the periphery of the disc member 12B immediately adjacent to the outer extremity of the blade 74, as seen in FIG. 3, and immediately preceding the cutting edge 76. Thus, bearing element 78 positively prevents the cutting blade from coming into contact with the cover, regardless of how the user may inadvertently deflect the rotating disc member 12B.

FIGS. 4 and 5 illustratively show the rounded bearing surface 80 sliding against the cover. It is to be understood that these FIGS. 4 and 5 are for purposes of illustration. In normal running operation the bearing element 78 clears the horizontal lower surface of the cover by a small distance, such as 1/32 to 3/32 of an inch.

It is to be understood that in lieu of the bearing element 78 in FIGS. 3, 4 and 5, an embossed hump 60A may be provided in the horizontal metal area 20, as shown in FIG. 3. One of these bearing humps 60A may be provided angularly displaced behind the cutter blade 74. Or a similar bearing hump 60A' may be provided in the horizontal metal area 20 ahead of the cutting edge 76. If desired, both of the embossed bearing humps 60A and 60A' may be employed in lieu of the bearing element 78. These bearing humps are positioned closely adjacent to the downturned flange 16 at the periphery of the disc member 12B.

In FIG. 4 the reference numbers 86 indicates an upstanding socket which is provided in the bottom of the bowl 36 surrounding but spaced away from the shaft 34, as shown in the patent referred to above.

It is to be noted that in each of the three embodiments of the rotary cutting tool 10, 10A and 10B the cutting elements normally are spaced away from the undersurface of the cover by a slightly greater amount such as 1/8th of an inch, than the elevation of the rounded bearing surfaces of the elements 60, 60A or 78 above these cutting elements. Thus, the bearing elements do not normally come into contact with the cover 44, unless the user inadvertently deflects the disc member 12, 12A or 12B up against the cover by over loading it in either manner described. Then the bearing elements slide almost effortlessly against the undersurface of the cover for holding the cutting elements spaced slightly down away from the cover.

I claim:

1. In rotary food processing apparatus having an upright working bowl with a vertical motor-driven shaft extending up into the bowl with its axis of rotation extending along the central axis of the bowl and in which a cover is secured in position extending across the top of the bowl in use, such cover including an upright feed tube which is offset entirely to one side of said axis of rotation, said feed tube serving for introducing food items down therethrough into the top of the bowl and in which a rotary tool has an elongated hub removably engaging down upon said drive shaft in driving relationship therewith and has a horizontal disc-like cutting member secured to the top of said hub which rotates about said axis of rotation in use, said disc-like cutting member having a horizontal area with a downturned flange around the perimeter thereof and with cutting means thereon projecting above the upper surface of said horizontal area, the improvement comprising means for preventing said cutting means from engaging the undersurface of the cover on the opposite side of the axis of rotation from said feed tube, said means including a bearing element positioned on said horizontal disc-like cutting member near said downturned flange, said bearing element being located near said cutting means within an angular displacement of no more than 45° therefrom, said bearing element having a bearing surface elevated above said cutting means, said elevated bearing surface being smooth and being adapted to slide on the undersurface of the cover on the opposite side of the axis of rotation from said feed tube for holding said cutting means down away from the cover in the event that the user overloads the rotating disc-like member by pushing food items too vigorously down through said offset feed tube causing the sector of the rotating disc-like member beneath said feed tube to deflect downwardly while the opposite sector of the disc-like member on the opposite side of the axis tends to be correspondingly deflected upwardly.

2. In rotary food processing apparatus, as claimed in claim 1, wherein said cutting means comprises a plurality of groups of claws for grating and rasping formed in said horizontal area of said disc-like cutting member said groups of claws being spaced about the axis of rotation, the improvement in which said bearing means comprises a plurality of embossed humps formed in said horizontal area and projecting above said groups of claws, one of said embossed humps being positioned near to each of said groups of claws, each of said embossed humps being angularly displaced from the group of claws with which it is associated by an angular displacement of from 10° to 45°.

3. In rotary food processing apparatus, as claimed in claim 2, the improvement in which said embossed humps have their elevated bearing surfaces located near to said downturned peripheral flange and spaced radially inwardly from said flange by a small spacing in the range from 3/32 to ⅜ of an inch.

4. In rotary food processing apparatus, as claimed in claim 2, the improvement in which said embossed humps are generally hemispherical.

5. In rotary food processing apparatus, as claimed in claim 1, wherein said cutting means is a slicing blade positioned above said horizontal area, said slicing blade extending from an inner end near the axis of rotation to an outer extremity near said downturned flange, the improvement in which said elevated bearing element is positioned near the periphery of said rotating disc-like member and is positioned immediately adjacent to the outer extremity of said blade for preventing said blade from coming in contact with the undersurface of the cover on the opposite side of the axis of rotation from said fuel tube.

6. In rotary food processing apparatus having an upright working bowl with a vertical motor-driven shaft extending up into the bowl with its axis of rotation extending along the central axis of the bowl and in which a cover is secured in position extending across the top of the bowl in use, such cover including an upright feed tube which is offset entirely to one side of said axis of rotation, said feed tube serving for introducing food items down therethrough into the top of the bowl and in which a rotary tool has an elongated hub removably engaging down upon said drive shaft in driving relationship therewith and has a horizontal disc-like member secured to the top of said hub which rotates about said axis of rotation in use, said disc-like member having a horizontal area with a downturned rim around the perimeter thereof, said horizontal area having a slot therein extending from said hub out to the periphery of said disc-like member and a slicing blade is on said member positioned behind said slot with a cutting edge projecting above said horizontal area and facing forward toward said slot for slicing food items introduced through said feed tube and said downturned rim bridges across the outer end of said slot, the improvement comprising at least one embossed hump in said horizontal area having a rounded bearing surface elevated above said horizontal area a small amount greater than the elevation of said cutting edge, said embossed bearing hump being closely adjacent to the rim of said disc-like member and being angularly displaced from the outer extremity of said slicing blade by no more than 45°, said elevated bearing surface being smooth and being adapted to slide on the undersurface of the cover on the opposite side of the axis of rotation from said feed tube for holding said cutting means down away from the cover in the event that the user overloads the rotating disc-like member by pushing food items too vigorously down through said offset feed tube causing the sector of the rotating disc-like member beneath said feed tube to deflect downwardly while the opposite sector of the disc-like member on the opposite side of the axis tends to be correspondingly deflected upwardly.

7. In rotary food processing apparatus having an upright working bowl with a verticle motor-driven shaft extending up into the bowl with its axis of rotation extending along the central axis of the bowl and in which a cover is secured in position extending across the top of the bowl in use, such cover including an upright feed tube which is offset entirely to one side of said axis of rotation, said feed tube serving for introducing food items down therethrough into the top of the bowl and in which a rotary tool has an elongated hub removably engaging down upon said drive shaft in driving relationship therewith and has a horizontal disc-like member secured to the top of said hub which rotates about said axis of rotation in use, said disc-like member having a horizontal area with a downturned rim around the perimeter thereof, said horizontal area having a slot therein extending from said hub out to the periphery of said disc-like member and a slicing blade is on said member positioned behind said slot with a cutting edge projecting above said horizontal area and facing forward toward said slot for slicing food items introduced through said feed tube and said downturned rim bridges across the outer end of said slot, the improvement comprising a bearing element mounted on said disc-like cutting member having a bearing surface elevated above said horizontal area thereof a small amount greater than the elevation of said cutting edge, said bearing element being mounted on said rim portion closely adjacent to the outer extremity of said slicing blade near the cutting edge thereof, said elevated bearing surface being smooth and being adapted to slide on the undersurface of the cover on the opposite side of the axis of rotation from said feed tube for holding said cutting means down away from the cover in the event that the user overloads the rotating disc-like member by pushing food items too vigorously down through said offset feed tube causing the sector of the rotating disc-like member beneath said feed tube to deflect downwardly while the opposite sector of the disc-like member on the opposite side of the axis tends to be correspondingly deflected upwardly.

\* \* \* \* \*